(12) United States Patent
Cai et al.

(10) Patent No.: US 11,962,885 B2
(45) Date of Patent: Apr. 16, 2024

(54) FIXING STRUCTURE AND DETECTION DEVICE HAVING THE SAME

(71) Applicant: TRIPLE WIN TECHNOLOGY(SHENZHEN) CO.LTD., Shenzhen (CN)

(72) Inventors: Mei Cai, Shenzhen (CN); Yen-Sheng Lin, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 240 days.

(21) Appl. No.: 17/701,864

(22) Filed: Mar. 23, 2022

(65) Prior Publication Data
US 2022/0337728 A1 Oct. 20, 2022

(30) Foreign Application Priority Data
Apr. 14, 2021 (CN) .......................... 202110401120.2

(51) Int. Cl.
*H04N 23/55* (2023.01)
*G02B 7/09* (2021.01)
*G03B 13/36* (2021.01)

(52) U.S. Cl.
CPC ............... *H04N 23/55* (2023.01); *G02B 7/09* (2013.01); *G03B 13/36* (2013.01)

(58) Field of Classification Search
CPC ...... H04N 23/55; H04N 17/002; H04N 23/57; H04N 23/54; H04N 5/781; H04N 23/51; H04N 1/00087; H04N 23/687; H04N 23/50; H04N 23/68; H04N 23/6812; H04N 23/685; H04N 1/00063; H04N 1/00031; H04N 13/246; H04N 13/327; H04N 1/00068; H04N 1/00519; G02B 7/09; G02B 26/121; G02B 7/04; G02B 21/241; G03B 13/36; G03B 3/10; G03B 43/00; G03B 13/00; G03B 17/425; G01M 11/02

See application file for complete search history.

(56) References Cited

U.S. PATENT DOCUMENTS

| 8,098,284 B2 * | 1/2012 | Ushijima | ............... H04N 23/54 348/335 |
| 2003/0021019 A1 * | 1/2003 | Kanao | .................. G02B 21/362 359/380 |

(Continued)

FOREIGN PATENT DOCUMENTS

| CN | 102937701 A | 2/2013 |
| TW | 201634913 A | 10/2016 |

*Primary Examiner* — Abdelaaziz Tissire
(74) *Attorney, Agent, or Firm* — ScienBiziP, P.C.

(57) ABSTRACT

A fixing structure includes a first supporting disc, a second supporting disc, and an electronic connector. The first supporting disc defines a first through hole. The second supporting disc is movably connected to the first supporting disc. The second supporting disc defines a first receiving groove for receiving a voice coil motor having a lens. The second supporting disc further defines a second through hole passing through a bottom of the first receiving groove. The first through hole and the second through hole are coaxial. The electronic connector is disposed on the second supporting disc, and can be electrically connected to the voice coil motor and an external power supply.

20 Claims, 6 Drawing Sheets

(56) References Cited

U.S. PATENT DOCUMENTS

| | | | |
|---|---|---|---|
| 2007/0131881 A1* | 6/2007 | Kim | H01L 27/14618 250/559.45 |
| 2007/0165131 A1* | 7/2007 | Ish-Shalom | H04N 23/54 348/E5.045 |
| 2012/0229652 A1* | 9/2012 | Lee | G03B 3/10 348/187 |
| 2022/0326475 A1* | 10/2022 | Liu | H04N 23/55 |

* cited by examiner

FIXING STRUCTURE AND DETECTION DEVICE HAVING THE SAME

FIELD

The subject matter relates to detection devices for imaging devices, and more particularly, to a fixing structure and a detection device having the fixing structure.

BACKGROUND

Electronic devices, such as tablet computers and smart phones, have camera modules. An auto-focus structure of the camera module may include a lens and a voice coil motor (VCM) for driving the lens to move, so that an auto-focus function can be realized.

The auto-focus structure needs to be tested to ensure an optical performance of the camera module. However, the lens and the VCM are independently tested. An existing detection device cannot be used when the lens is cooperated with the VCM. That is, a working state when the lens is cooperated with the VCM cannot be detected. Thus, whether the optical performance of the lens is qualified when the VCM drives the lens to move cannot be detected. Therefore, there is room for improvement in the art.

BRIEF DESCRIPTION OF THE DRAWINGS

Implementations of the present technology will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
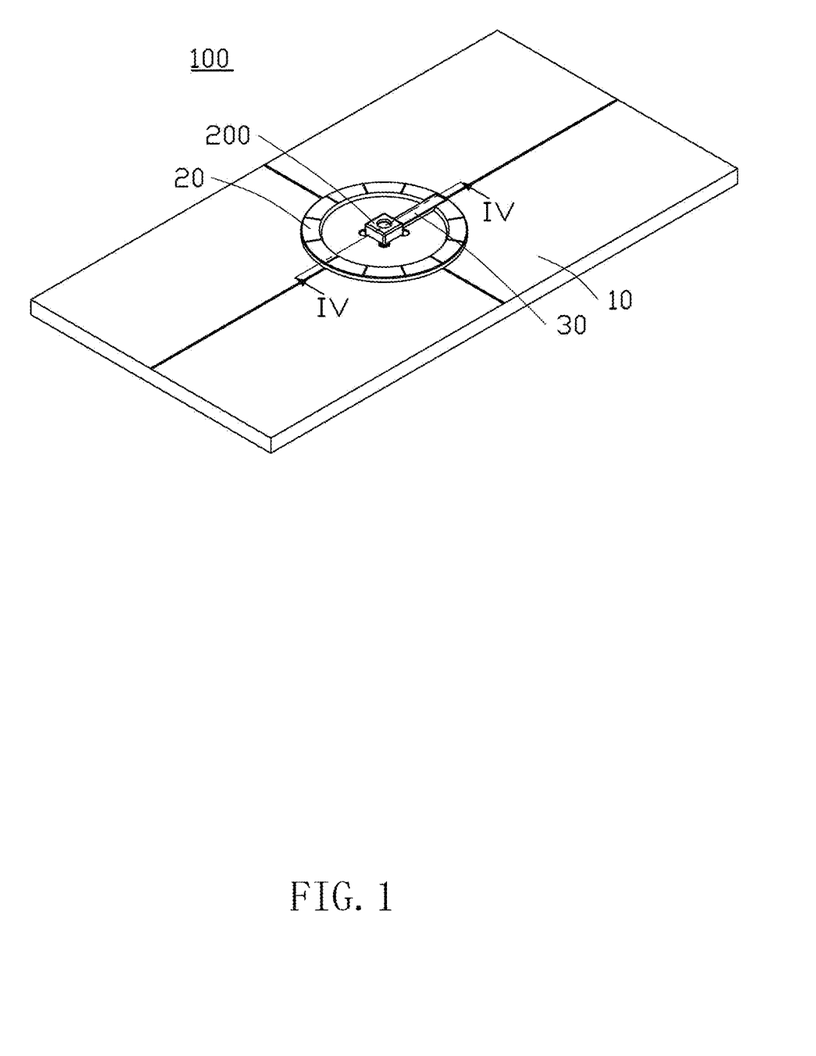
FIG. 1 is a diagrammatic view of an embodiment of a fixing structure according to the present disclosure.
Figure 2:
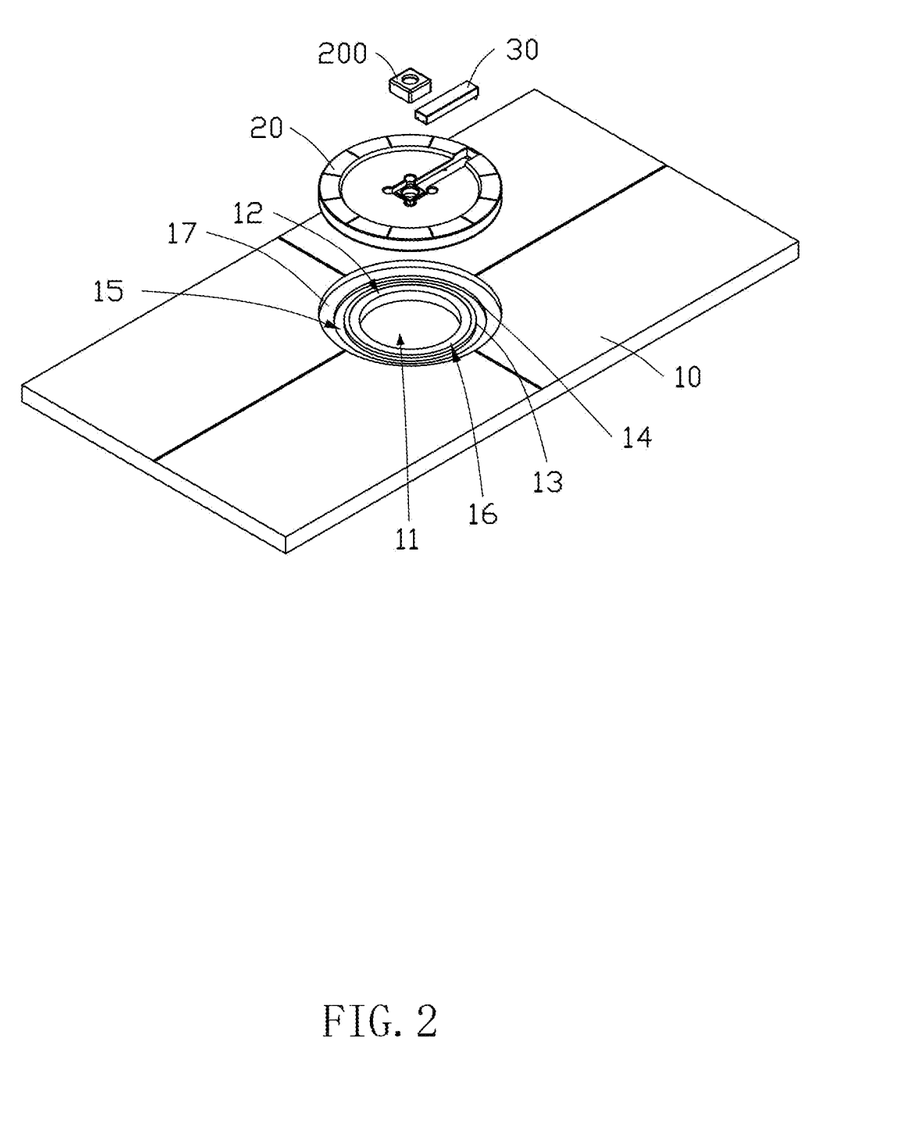
FIG. 2 is an exploded view of the fixing structure of FIG. 1.
Figure 3:
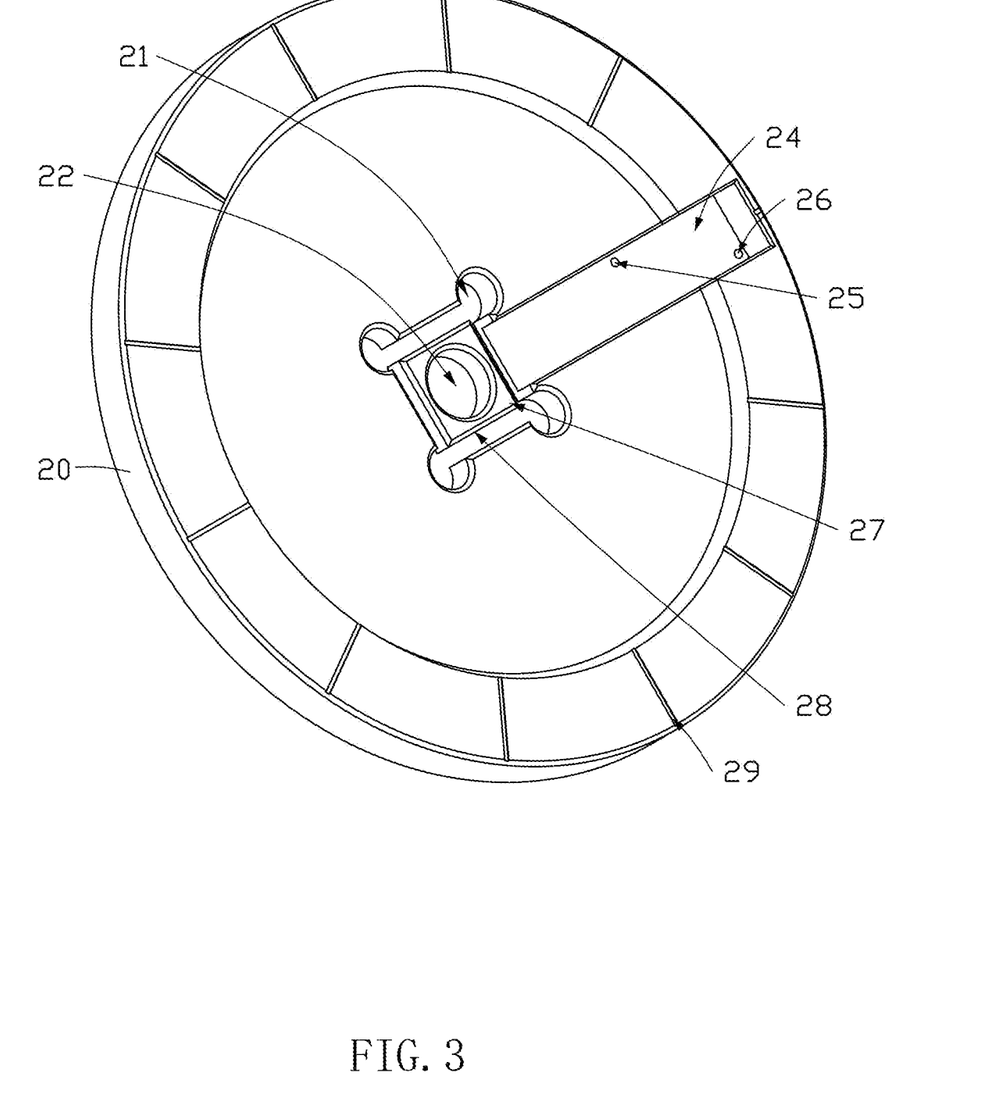
FIG. 3 is a diagrammatic view of a second supporting disc of the fixing structure of FIG. 1.

Referring to FIGS. 1 to 3, an embodiment of a fixing structure 100 is provided according to the present disclosure. The fixing structure 100 includes a first supporting disc 10, a second supporting disc 20, and an electronic connector 30. The second supporting disc 20 is movably arranged on the first supporting disc 10. The second supporting disc 20 defines a first receiving groove 21 for receiving a voice coil motor 200 having a lens 300 (shown in FIG. 4). The first supporting disc 10 defines a second receiving groove 12, and the second supporting disc 20 is received in the second receiving groove 12. The second supporting disc 20 also defines a third receiving groove 24. The electronic connector 30 is received in the third receiving groove 24, and electrically connected between the voice coil motor 200 and an external power supply (not shown). The voice coil motor 200 drives the lens 300 to move when energized by the external power supply, so that an optical detection module 401 (shown in FIG. 6) can detect an optical performance of the lens 300 when the lens 300 moves.

Figure 4:
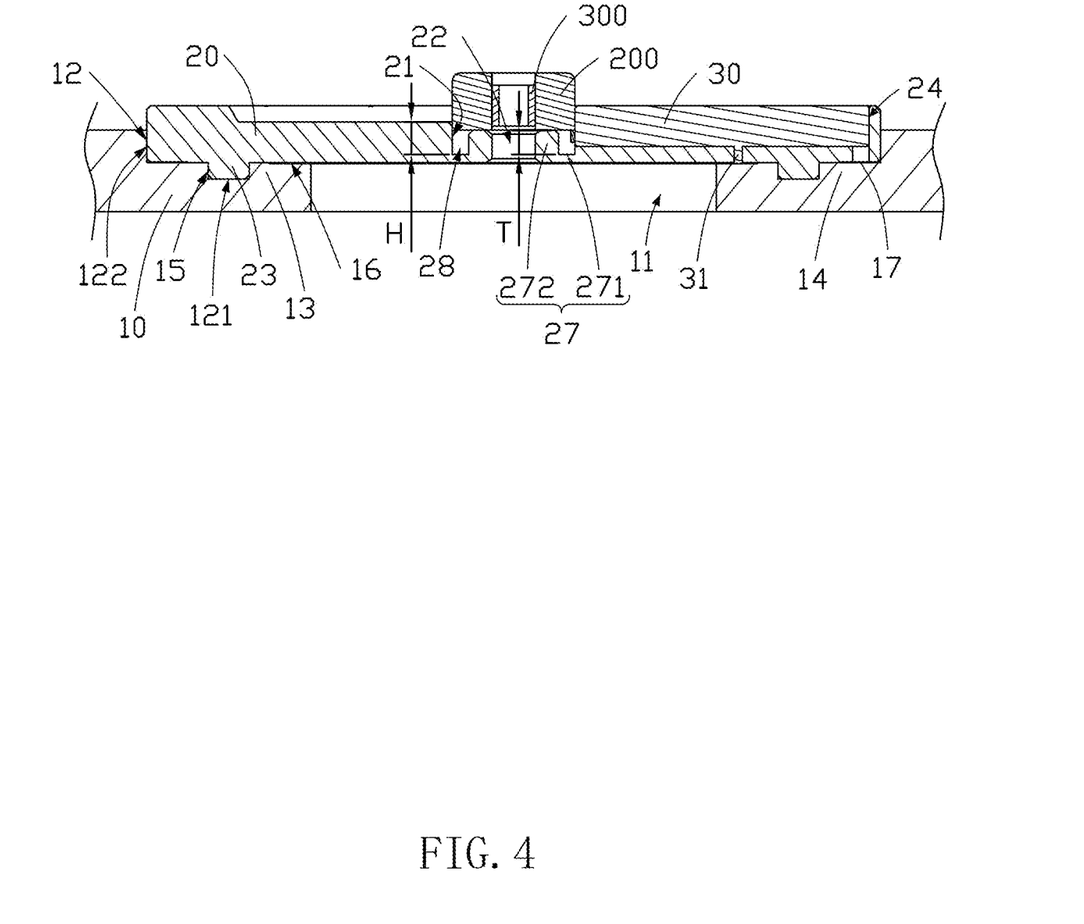
FIG. 4 is a cross-sectional view of the fixing structure along IV-IV of FIG. 1.

Referring to FIG. 2 and FIG. 4, the first supporting disc 10 further defines a first through hole 11 passing through a bottom of the second receiving groove 12. The first supporting disc 10 forms a first surface 121 and a second surface 122 at the bottom and an inner sidewall of the second receiving groove 12, respectively. The first supporting disc 10 has a first protrusion 13 and a second protrusion 14 each protruding from the first surface 121. An edge of the first protrusion 13 away from the second surface 122 is flush with an edge of the first through hole 11. The second protrusion 14 is arranged at a connection region between the second surface 122 and the first surface 121. A first gap 15 is defined between the first protrusion 13 and the second protrusion 14. In at least one embodiment, each of the first protrusion 13 and the second protrusion 14 is annular.

A first coil 16 is disposed on the first protrusion 13. A second coil 17 is disposed on the second protrusion 14. One of the first coil 16 and the second coil 17 is a positive coil, and the other one is a negative coil. Both the first coil 16 and the second coil 17 are electrically connected to the electronic connector 30. The first coil 16 and the second coil 17 can effectively energize the second supporting disc 20 when the first supporting disc 10 is connected to the second supporting disc 20. In at least one embodiment, the first supporting disc 10 is made of an insulating material. Each of the first coil 16 and the second coil 17 can be made of metal, conducive plastic, or composite material.

A surface of the second supporting disc 20 facing the first supporting disc 10 includes a positioning protrusion 23. The positioning protrusion 23 is received in the first gap 15. Thus, the first supporting disc 10 and the second supporting disc 20 are detachably connected together. In at least one embodiment, the positioning protrusion 23 is annular, so that the connection between the second supporting disc 20 and the first supporting disc 10 is more stable.

Referring to FIG. 3 and FIG. 4, the second supporting disc 20 also defines a second through hole 22 passing through a bottom of the first receiving groove 21. The second through hole 22 is coaxial with the first through hole 11. The voice coil motor 200 having the lens 300 is received in the first receiving groove 21, and the external power supply provides electric power for the voice coil motor 200 through the electronic connector 30, so that the voice coil motor 200 drives the lens 300 to move. The optical detection module 401 is disposed above the first through hole 11 and the second through hole 22, and detects the optical performance of the lens 300 that is moving through the first through hole 11 and the second through hole 22. The size of the second supporting disc 20 can be changed according to the size of the voice coil motor 200 and the lens 300.

In addition, the fixing structure 100 can also test the optical performance of the lens 300 separately. That is, the lens 300 is first in the first receiving groove 21, causing the lens 300 to face the first through hole 11. Then, the optical detection module 401 can test the optical performance of the lens 300.

Figure 5:
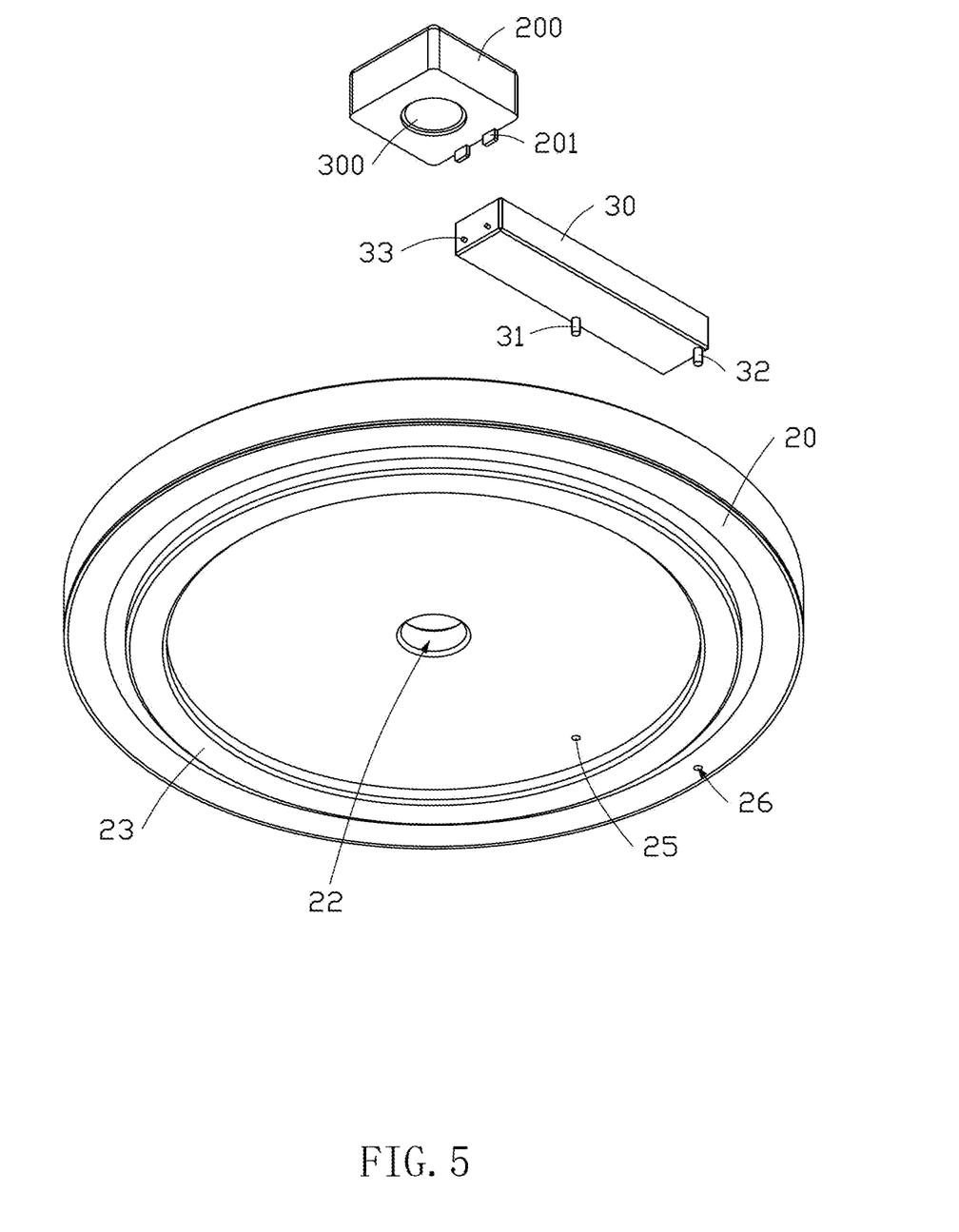
FIG. 5 is similar to FIG. 2, but showing the fixing structure from another angle.

Referring to FIGS. 3, 4, and 5, the second supporting disc 20 also includes an annular flange 27 extending from the inner wall of the second through hole 22. The annular flange 27 includes a connecting portion 271 connected to the inner wall of the second through hole 22 and a boss 272 protruding from the connecting portion 271. The boss 272 is used to support the voice coil motor 200. A height T of the boss 272 protruding from the connecting portion 271 is less than a depth H of the first receiving groove 21. Thus, the voice coil motor 200 is firmly disposed in the first receiving groove 21. A second gap 28 is defined between the boss 272 and the inner wall of the first receiving groove 21. The voice coil motor 200 has at least one wire post 201 for connecting the electronic connector 30, and each wire post 201 is disposed in the second gap 28.

Referring to FIGS. 3 to 5, the first receiving groove 21 communicates with the third receiving groove 24. In at least one embodiment, the electronic connector 30 is a pin connector, which includes a first pin 31, a second pin 32, and at least one third pin 33. Each third pin 33 is partially disposed in the second gap 28, and is connected to one wire post 201 of the voice coil motor 200 to realize the electrical connection between the voice coil motor 200 and the electronic connector 30. In at least one embodiment, two third pins 33 are included, which are connected to two wire posts 201 of the voice coil motor 200.

The second supporting disc 20 also defines a first mounting hole 25 and a second mounting hole 26 each passing through the bottom of the third receiving groove 24. The first pin 31 of the electronic connector 30 passes through the first mounting hole 25, and is then electrically connected to the first coil 16. The second pin 32 passes through the second mounting hole 26, and is then electrically connected to the second coil 17. The first coil 16 and the second coil 17 are energized by the external power supply connected by the electronic connector 30. When the external power supply energizes the voice coil motor 200 through the electronic connector 30, the voice coil motor 200 drives the lens 300 to move. In at least one embodiment, the external power supply is controlled by a digital power controller to provide driving currents of different values to the voice coil motor 200. Therefore, the optical performance of the lens 300 driven by different driving currents can be tested.

Referring to FIG. 3, the second supporting disc 20 is annular, and scale lines 29 are arranged at the edge of the second supporting disc 20. The scale lines 29 allow the voice coil motor 200 to be accurately disposed in the first receiving groove 21, which improves accuracy of the test.

Figure 6:
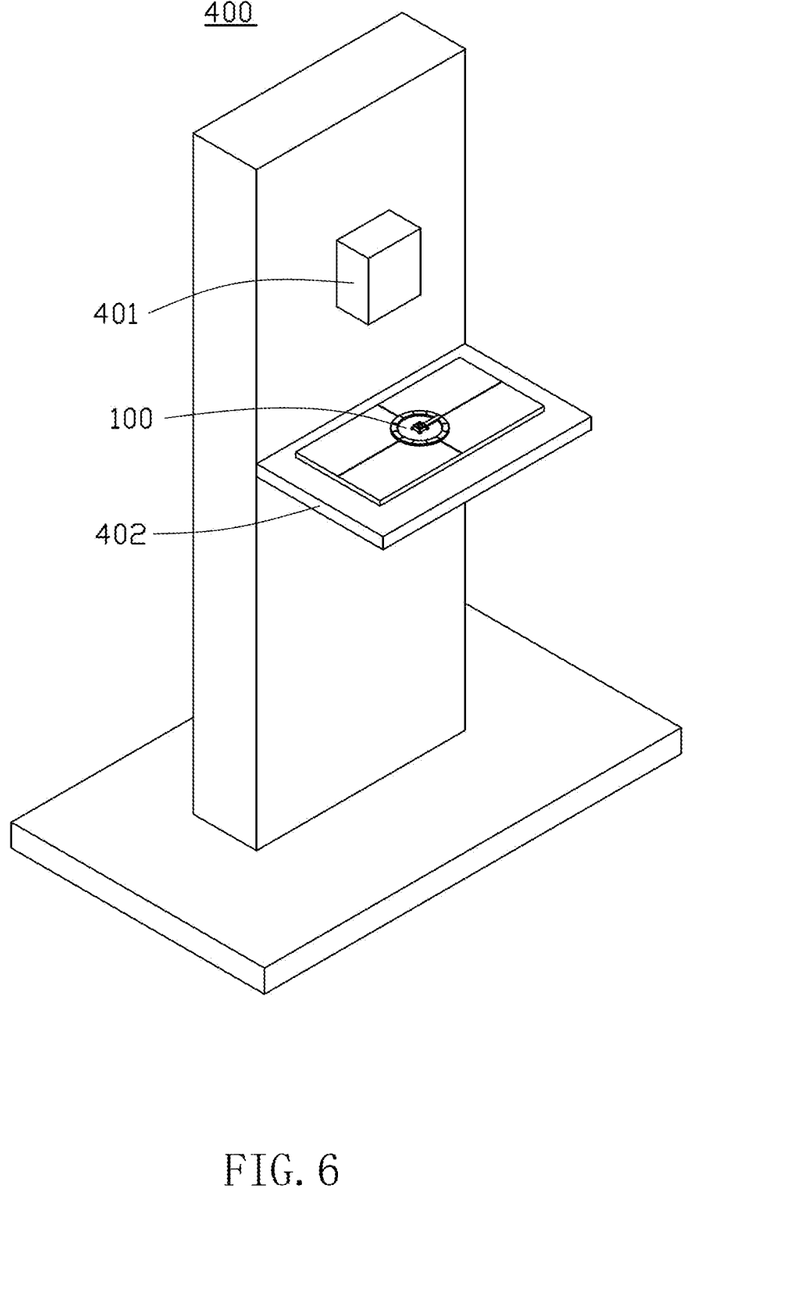
FIG. 6 is a diagrammatic view of an embodiment of a detection device according to the present disclosure.

Referring to FIG. 6, an embodiment of a detection device 400 is further provided according to the present disclosure. The detection device 400 can be a pro optical detection device table, an HR optical detection device table, and other optical detection instruments. The detection device 400 includes the fixing structure 100, the optical detection module 401, and a detection platform 402. The fixing structure 100 is disposed on the detection platform 402. The optical detection module 401 is disposed above the fixing structure 100. The voice coil motor 200 having the lens 300 is disposed on the fixing structure 100. The optical detection module 401 emits light beams, which pass through the lens 300 and then reaches an image sensor. Thus, the optical performance of the lens 300 is detected.

With the above configuration, the fixing structure 100 enables the test of the optical performance of the lens 300 when driven by the voice coil motor 200. Furthermore, the first supporting disc 10 and the second supporting disc 20 are movably connected to each other, so that the second supporting disc 20 can be changed according to the size of the voice coil motor 200 and lens 300.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A fixing structure comprising:
a first supporting disc defining a first through hole;
a second supporting disc movably connected to the first supporting disc, the second supporting disc defining a first receiving groove, the first receiving groove configured to receive a voice coil motor having a lens, the second supporting disc further defining a second through hole passing through a bottom of the first receiving groove, the first through hole and the second through hole being coaxial; and
an electronic connector disposed on the second supporting disc, the electronic connector configured to electrically connected to the voice coil motor and an external power supply.

2. The fixing structure according to claim 1, wherein a positioning protrusion is disposed on a surface of the second supporting disc facing the first supporting disc;
the first supporting disc defines a second receiving groove for receiving the second supporting disc, the first through hole passes through a bottom of the second receiving groove, the first supporting disc forms a first surface and a second surface at the bottom and an inner sidewall of the second receiving groove, respectively;
the first supporting disc comprises a first protrusion and a second protrusion protruding from the first surface, a first gap is defined between the first protrusion and the second protrusion, and the positioning protrusion is received in the first gap.

3. The fixing structure according to claim 2, wherein the second supporting disc further defines a third receiving groove, the third receiving groove communicates with the first receiving groove, and the electronic connector is received in the third receiving groove.

4. The fixing structure according to claim 3, further comprising a first coil and a second coil, wherein the first coil is disposed on the first protrusion, the second coil is disposed on the second protrusion, and each of the first coil and the second coil is electrically connected to the electronic connector.

5. The fixing structure according to claim 4, wherein the electronic connector comprises a first pin and a second pin, the first pin is connected to the first coil, and the second pin is connected to the second coil.

6. The fixing structure according to claim 5, wherein the second supporting disc further defines a first mounting hole and a second mounting hole, each of the first mounting hole and the second mounting hole passes through a bottom of the third receiving groove, the first pin passes through the first mounting hole and is connected to the first coil, and the second pin passes through the second mounting hole and is connected to the second coil.

7. The fixing structure according to claim 5, wherein the electronic connector further comprises two third pins, one end of each of the two third pins is received in the first receiving groove and connected to the voice coil motor.

8. The fixing structure according to claim 7, wherein the second supporting disc further comprises an annular flange protruding from an inner sidewall of the second through hole, the annular flange comprises a connecting portion connected to the inner sidewall of the second through hole and a boss protruding from the connecting portion, the boss is configured to support the voice coil motor, and a height of the boss is less than a depth of the first receiving groove.

9. The fixing structure according to claim 8, wherein a second gap is defined between the boss and an inner sidewall of the first receiving groove, and the two third pins are disposed in the second gap.

10. The fixing structure according to claim 2, wherein the positioning protrusion is annular.

11. A detection device comprising:
    an optical detection module;
    a detection platform; and
    a fixing structure disposed on the detection platform, the optical detection module disposed above the fixing structure, the fixing structure comprising:
        a first supporting disc defining a first through hole;
        a second supporting disc movably connected to the first supporting disc, the second supporting disc defining a first receiving groove, the first receiving groove configured to receive a voice coil motor having a lens, the second supporting disc further defining a second through hole passing through a bottom of the first receiving groove, the first through hole and the second through hole being coaxial; and
        an electronic connector disposed on the second supporting disc, the electronic connector configured to electrically connected to the voice coil motor and an external power supply.

12. The detection device according to claim 11, wherein a positioning protrusion is disposed on a surface of the second supporting disc facing the first supporting disc;
    the first supporting disc defines a second receiving groove for receiving the second supporting disc, the first through hole passes through a bottom of the second receiving groove, the first supporting disc forms a first surface and a second surface at the bottom and an inner sidewall of the second receiving groove, respectively;
    the first supporting disc comprises a first protrusion and a second protrusion protruding from the first surface, a first gap is defined between the first protrusion and the second protrusion, and the positioning protrusion is received in the first gap.

13. The detection device according to claim 12, wherein the second supporting disc further defines a third receiving groove, the third receiving groove communicates with the first receiving groove, and the electronic connector is received in the third receiving groove.

14. The detection device according to claim 13, wherein the fixing structure further comprises a first coil and a second coil, the first coil is disposed on the first protrusion, the second coil is disposed on the second protrusion, and each of the first coil and the second coil is electrically connected to the electronic connector.

15. The detection device according to claim 14, wherein the electronic connector comprises a first pin and a second pin, the first pin is connected to the first coil, and the second pin is connected to the second coil.

16. The detection device according to claim 15, wherein the second supporting disc further defines a first mounting hole and a second mounting hole, each of the first mounting hole and the second mounting hole passes through a bottom of the third receiving groove, the first pin passes through the first mounting hole and is connected to the first coil, and the second pin passes through the second mounting hole and is connected to the second coil.

17. The detection device according to claim 15, wherein the electronic connector further comprises two third pins, one end of each of the two third pins is received in the first receiving groove and connected to the voice coil motor.

18. The detection device according to claim 17, wherein the second supporting disc further comprises an annular flange protruding from an inner sidewall of the second through hole, the annular flange comprises a connecting portion connected to the inner sidewall of the second through hole and a boss protruding from the connecting portion, the boss is configured to support the voice coil motor, and a height of the boss is less than a depth of the first receiving groove.

19. The detection device according to claim 18, wherein a second gap is defined between the boss and an inner sidewall of the first receiving groove, and the two third pins are disposed in the second gap.

20. The detection device according to claim 12, wherein the positioning protrusion is annular.

\* \* \* \* \*